(12) United States Patent
Connor et al.

(10) Patent No.: US 6,635,350 B2
(45) Date of Patent: Oct. 21, 2003

(54) POLYMERIC 1,5- OR 1,8-DISUBSTITUTED ANTHRAQUINONE-DERIVATIVE COLORANTS AND ARTICLES COMPRISING SUCH COLORANTS

(75) Inventors: Daniel M. Connor, Inman, SC (US); John W. Miley, Jr., Campobello, SC (US)

(73) Assignee: Milliken & Company, Spartanburg, SC (US)

( * ) Notice: Subject to any disclaimer, the term of this patent is extended or adjusted under 35 U.S.C. 154(b) by 137 days.

(21) Appl. No.: 09/981,279

(22) Filed: Oct. 16, 2001

(65) Prior Publication Data

US 2003/0096118 A1 May 22, 2003

(51) Int. Cl.$^7$ .......................... B32B 9/00; C07C 50/18; C07C 50/24; C07C 50/26; C09B 1/16
(52) U.S. Cl. .................... 428/411.1; 106/493; 552/208; 552/238; 552/255; 552/258
(58) Field of Search .......................... 106/493; 552/208, 552/238, 255, 258; 428/411.1

(56) References Cited

U.S. PATENT DOCUMENTS

| | | | |
|---|---|---|---|
| 4,999,418 A | 3/1991 | Krutaka et al. | 528/272 |
| 5,882,358 A * | 3/1999 | Smith et al. | 8/527 |
| 6,447,591 B1 * | 9/2002 | Titterington et al. | 106/31.29 |

* cited by examiner

*Primary Examiner*—Ramsey Zacharia
(74) *Attorney, Agent, or Firm*—Terry T. Moyer; William S. Parks

(57) ABSTRACT

Red colorants comprising a chromophore having at least one poly(oxyalkylene) chain attached to the 1-position, as well as at least one poly(oxyalkylene) chain attached to either the 5-position or the 8-position of an anthraquinone backbone are provided. Such colorants exhibit excellent base stability, effective colorations, excellent low extraction rates, and high lightfastness levels, particularly when incorporated within certain media and/or on the surface of certain substrates, particularly polyesters. The poly(oxyalkylene) chains also increase the solubility in different solvents or resins thereby permitting the introduction of such excellent coloring chromophores within diverse media and/or diverse substrates as well as provides a liquid colorant which facilitates handling. Compositions and articles comprising such colorants are provided as well as methods for producing such inventive colorants are also provided.

10 Claims, No Drawings

POLYMERIC 1,5- OR 1,8-DISUBSTITUTED ANTHRAQUINONE-DERIVATIVE COLORANTS AND ARTICLES COMPRISING SUCH COLORANTS

FIELD OF THE INVENTION

This invention relates to red colorants comprising a chromophore having at least one poly(oxyalkylene) chain attached to the 1-position, as well as at least one poly(oxyalkylene) chain attached to either the 8-position or the 5-position of an anthraquinone backbone. Such colorants exhibit excellent thermal stability, effective colorations, excellent low extraction rates, and high lightfastness levels, particularly when incorporated within certain media and/or on the surface of certain substrates, particularly polyesters. The poly(oxyalkylene) chains also increase the solubility in different solvents or resins thereby permitting the introduction of such excellent coloring chromophores within diverse media and/or on diverse substrates as well as provides a liquid colorant which facilitates handling. Compositions and articles comprising such colorants are provided as well as methods for producing such inventive colorants.

DISCUSSION OF THE PRIOR ART

All U.S. patents cited within this specification are hereby incorporated by reference.

There continues to be a need to provide versatile colorants within various applications such that the coloring agent itself exhibits excellent colorations (particularly at low color loadings due to inherently high absorption), high thermal stability, effective lightfastness, low extraction (or drastic reduction in possibility of removal therefrom via extraction by solvents or like sources), ease in handling, ability to mix thoroughly with other coloring agents and thus to provide effective different hues and tints within or on target substrates, and acceptable toxicity levels. There has been a need to provide improved colorants meeting this criteria for certain thermoplastic media, such as polyesters, such that the colorants themselves exhibit excellent compatibility therein (for instance in terms of dispersion and the other characteristics desired for such plastics as noted above). In particular, such characteristics for polyesters are desired for colorants that impart, for example, though not necessarily, a red shade. Other hues are available as well for such a desired, high-performing polyester plastic colorant, including violet, as one example, dependent on the presence of certain coupling or modifying moieties present on the chromophore backbone itself. It is believed and, as noted above, has been determined, that such desirable polyester plastic colorations with the characteristics noted above are possible through the addition of certain pendant groups to the chromophore backbone which do not act as couplers or color modifiers [such as, for example poly(oxyalkylene) groups] and thus any chromophore (and resultant hue or tint) may be utilized with the desired anthraquinone chromophore itself.

Previous coloring agents for such end-uses have included pigments, dyes, or dyestuffs, with each having its own drawback, be it an extraction problem from the finished article, a handling problem during manufacturing due to solid dust particles, a staining problem, due to the difficulty associated with cleaning such coloring agents from manufacturing machinery after colored plastic production, and other like issues. As a result, there is a clear desire to provide easier to handle, less extractable, easy-to-clean, etc., coloring agents for introduction within thermoplastic articles to provide decorative, aesthetic, and other like effects. However, the chromophores present within such dyes, pigments, and the like, are highly desired for the hues and shades they provide within the ultimate thermoplastic articles themselves. Facilitating the introduction of such chromophores within such formulations is thus a highly desired target within the colored thermoplastic industry, whether it be in terms of handling, extraction, cleaning, or the like.

Attempts to meet this desire have included the introduction of certain standard types of polymeric colorants within plastics (be they thermoplastic-or thermoset-types). These colorants are primarily poly(oxyalkylenated) compounds, such as triphenylmethanes, methines, and the like (i.e., those found within U.S. Pat. No. 4,992,204, to Kluger et al.). Some of these colorants exhibit certain problems during incorporation into thermosets and thermoplastics. In thermoplastic compositions such as polyesters, many of these previously disclosed compositions are not stable at the polyester processing temperatures. As a result, the colorations provided by such polymeric colorants may be reduced in strength or changed in shade under such circumstances. Other types of colorants have been discussed within the prior art, such as azos and bisazos, but the specific colorations provided by such compounds are limited to certain hues and their utilization within polyesters is suspect from a number of perspectives (such as thermal stability, and the like). There is thus a desire to introduce new types of colorants comprising different types of chromophores for the purpose of providing new, effective, versatile colorants for such myriad end-uses as noted above and that exhibit excellent colorations, extraction, thermal stability, mixing with other coloring agents, and low toxicity, at least.

One approach to obtain the desired coloration has been to use difunctional dyes that possess the necessary pendant groups to allow them to be copolymerized into a thermoplastic like polyester. This approach is exemplified by U.S. Pat. No. 4,999,418 to Krutak et al. Though such a method provides effectively colored thermoplastics with good performance such as excellent extraction (due to the copolymerized nature of the dyes), good lightfastness, low toxicity, and the like, there are many drawbacks to such technology. Primarily, such drawbacks include the necessity for extremely thermally stable chromophores because the colorant must survive in the reactor for extended periods of time in addition to the heat history afforded by the molding of the finished article (e.g., such thermal stability requirements greatly limit the selection of hues and often provides for more expensive colorant molecules). Another drawback is the necessity of dedicating a high cost polyester production vessel to color due to the inherent contamination of the vessel by the colorant (which invariably limits flexibility in manufacturing of resins). Furthermore, another drawback is the necessity of the end user or article manufacturer to store large amounts of colored resins of different shades which limits the flexibility and adds cost to the end user. The colorants disclosed, for example within U.S. Pat. No. 4,499,418, are inherently powdered or like solid in nature and thus are not suitable for direct addition to the molten plastic during any injection molding step, as one example. Such powdered coloring agents are developed solely for actual polymerization within the target resin prior to any molding, injection, and other like process step. Drawbacks, thus, to these powdered types include undesirable dusting, contamination and staining of equipment, clogging (during feeding into the molten resin, for example), and poor control of metering during coloring of the target resin within and/or at the molding machinery. Other less noticeable drawbacks exist for such standard polyester coloring technology; however, these issues clearly show that improvements are highly desired to provide easily handled liquid colorants for polyester which are thermally stable and offer excellent performance in areas such as extraction.

Another approach to coloration of thermoplastics such as polyesters and namely polyethylene terephthalate has been through the use of pigments (Thomas G. Weber, Editor, Coloring of Plastics, John Wiley and Sons, New York, 1979). The use of pigments (either neat or in a liquid dispersion), however, is accompanied by undesireable properties such as opacity, dullness of color, low tinctorial strength, and the like, associated with such pigment compounds and formulations. Also, difficulties in uniformly blending the insoluble pigments with the thermoplastic resin are encountered. In addition, with pigment dispersions, significant issues arise with transportation and storage due to the propensity for settling. Also there are problems with clean-up due to the propensity of pigments for staining equipment and personnel.

Anthraquinone-based colorants have been known in the art for a long period of time and are widely used due to their high color strength, broad range of shades, and many are thermally stable. More specifically, anthraquinone colorants such as that shown in comparative example 1, below, are known in the art and are disclosed in Great Britain Patent No. 2,011,940 and U.S. Pat. No. 5,993,958 and the 4,4'-hydroxyphenylamino derivative is disclosed in Pellatt, *Molecular Crystals and Liquid Crystals,* 1980, Vol. 59, pp. 299–316. However, no fair mention is made of liquid or polymeric derivatives of these colorants, and particularly not of reacting such polymeric derivatives into polyester. Colorants with the general structure of that shown in comparative example 3, below, are disclosed for example in U.S. Pat. No. 3,372,138 and Great Britain Patent No.1,074829 (both to ICI). These colorants, functionalized by two carboxylic acid groups, are known to be co-polymerized into polyester. However, no teaching or fair suggestion of polymeric versions of such colorants is known, nor is it taught nor fairly suggested that these colorants could be added during the molding step of polyester articles. These colorants are pigment-based in nature and are thus subject to the disadvantages noted above in association with such pigments within polyester articles (primarily, though not exclusively, poor dispersion in this case) when added during a molding operation for example instead of being incorporated during polymer synthesis. Colorants of the general structure shown in comparative example 2 are known and disclosed for example in U.S. Pat. No. 4,999,418. It is taught in this patent that these dihydroxy-functionalized chromophores can be co-polymerized into polyester to afford effective coloration. It is also taught in this patent that anthraquinone colorants substituted in the 1,5-or 1,8-position with alkyl amines which afford two methylene groups substituted only with hydrogen next to the nitrogen do not offer the necessary thermal stability. It is in the light of copolymerizing the specified colorant into the polyester which requires extended periods of time at the polymerization temperatures that these claims are based. Due to the need to copolymerize the disclosed chromophores, the inventor discloses the use of 1,5-and 1,8-dialkyl-aminosubtituted anthraquinone dyes with alkyl substituents on the beta carbon to afford the necessary thermal stability. The amines required to produce such chromophores are very expensive and thus not desired. Improvements to such technology through providing thermally stable, low-cost, polymeric liquid anthraquinone-based colorants of this chromophore type are thus highly desired. As discussed in greater detail below, the novel inventive liquid polymeric colorants disclosed herein allow for easy addition of the colorant during the molding or masterbatching process and thus, drastically reduce the heat history experienced by the colorant and thus provide for coloration with anthraquinone chromophores made from more readily available amines.

Also, amino acid based anthraquinone colorants are known such as the caproic acid anthraquinone compounds described and taught by Liu, Zhenguo, et al., *Polymer International,* 44 (2), pp. 134–136 (1997), specifically taught here are coloring agents for medical purposes involving nylons made from the reaction of 1,5-dichloroanthraquinone, 6-aminocaproic acid, and caprolactam. The colorants are reacted into the nylon during the nylon synthesis. These colorants are also taught in Rao et al. *J. Soc. Dyers and Colour.* 106, 388–394 (1990), as disperse dyes for polyester fibers. Such colorants are solid in nature potentially waxy solids, not waxy liquids) and thus are difficult to handle in PET molding operations. These references fail to discuss or fairly suggest the implementation of such compounds within polyesters or as liquids themselves. The colorant made from glycine and 1,5-dichloroanthraquinone is taught in Monatsh. Chem. 31, 386 (1910). Such colorants are solid pigment in nature. This reference fails to discuss or fairly suggest the implementation of such compounds within polymers, polymeric forms of these compounds, or these type compounds as liquids. As such, there still remains no teaching or fair suggestion of liquid red colorants for introduction within thermoplastics as is highly desired, as discussed above.

DESCRIPTION OF THE INVENTION

It has thus now been determined that poly(oxyalkylene) chains attached to certain 1,5-or 1,8-disubstituted anthraquinones provides such a needed and highly desired liquid red colorant, particularly for utilization within thermoplastic and thermoset applications. It is thus an object of the invention to provide such a colorant exhibiting (at least) excellent colorations, low extraction, thermal stability, and lightfastness within target thermoplastic and/or thermoset articles. Another object of this invention is to provide a red polymeric colorant exhibiting poly(oxyalkylene) groups that is easy to process, mixes well within target plastics, and provides excellent colorations within the target finished articles. Yet another object of this invention is to provide excellent colorations within liquid compositions (such as inks, and the like) through the utilization of such water-soluble, red liquid anthraquinone-based polymeric colorants, as noted above.

It is to be understood that the term alkyl as used throughout is intended to encompass any straight or branched alkyl moiety, having anywhere from 1 to 30 carbons therein; the same chain length applies to the term "alkoxy" as well. Also, the terms substituted phenyl and substituted polyphenyl are intended to encompass any phenyl system having any type of pendant group attached thereto, including, without limitation, alkyl groups, alkylene groups, alcohol groups, ether groups, ester groups, amine groups, amide groups, hydroxyls, and the like. Phenyl is basically an unsubstituted ring system (and thus includes hydrogens only).

The present invention preferably encompasses colorants conforming to the structure of Formula (I)

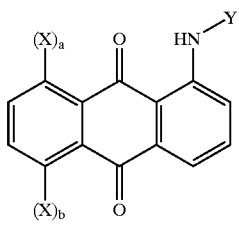

(I)

wherein X is N(H)Y; a is 0 or 1 and b is 0 or 1; wherein if a=1 then b=0 and if b=1 then a=0; Y is $[(D)_z-Q]_w$—F, wherein D is selected from the group consisting of phenyl, substituted phenyl, and straight or branched $C_{1-30}$ alkylene, wherein z is any of 0 to 3, and wherein F conforms to the structure of Formula (II)

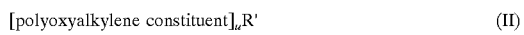

[polyoxyalkylene constituent]$_u$R'  (II)

wherein u is 1 or 2; polyoxyalkylene constituent is selected from the group consisting of at least three monomers of at least one $C_{2-20}$ alkyleneoxy group, glydicol, glycidyl, or mixtures thereof, monomers of at least one $C_{2-20}$ alkyleneoxy group, glydicol, glycidyl, or mixtures thereof; and R' is selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ $C_{1-20}$ alkylsufonyl, $C_{1-20}$ alkylphenyl, phosphonyl, $C_{1-20}$ alkylphosphonyl, $C_{1-20}$ alkoxycarbonyl, and phenylthio; Q is selected from the group conssiting of N, O, S, $SO_2$, $SO_3$, $CO_2$, $SO_2N$, alkyl, and alkoxy; and w is 0 or 1. Preferably, b is 1, a is 0, D is phenyl, Q is O, z is 1, w is 1, polyoxyalkylene constituent is either from about 3 to about 25 moles of ethylene oxide (hereinafter referred to as EO), or a combination of from about 3 moles to about 12 moles of EO and from about 2 moles to about 12 moles of propylene oxide (hereinafter referred to as PO), u is 1, and R' is hydrogen. More thorough descriptions of such groups are presented below. It should be apparent to one ordinarily skilled within this art that, although the most preferred colorants are of 1,5-disubstitution on the anthraquinone backbone, the 1,8-disubstituted analogues thereof are easily produced from similar starting materials. Such preferred 1,5-disubstituted starting materials are generally less expensive than the 1,8-types. In such a compound, preferably the R' group is attached to said polyoxyalkylene constituent via an oxygen.

Compositions comprising such compounds conforming to the broad structure of Formula (I) are also encompassed within this invention, particularly those comprising such compounds and bluing agents, as liquids or as pellets for further introduction within desired molten thermoplastic formulations. Methods of making such compositions, particularly thermoplastics, comprising such compounds of (I), above, are also contemplated within this invention.

The term "thermoplastic" is intended to encompass any synthetic polymeric material that exhibits a modification in physical state from solid to liquid upon exposure to sufficiently high temperatures. Most notable of the preferred thermoplastic types of materials are polyolefins (i.e., polypropylene, polyethylene, and the like), polyester (i.e., polyethylene terephthalate, polybutylene terephthalate, polypropylene terephthalate and the like), polyamides (i.e., nylon-1,1, nylon-1,2, nylon-6 or nylon-6,6), polystyrenes, polyurethanes, polycarbonates, polyvinyl halides (i.e., polyvinyl chloride and polyvinvyl difluoride, as merely examples), and the like. Preferred thermoplastics within this invention are polyesters, and most preferred is polyethylene terephthalate.

Such thermoplastic articles include bottles, storage containers, sheets, films, fibers, plaques, hoses, tubes, syringes, and the like. Included within this list would be polyester, polystyrene and other like resinous materials in sheet form which are present within windows for strength and resiliency functions. In such an instance, the inventive colorant compounds would provide or contribute to excellent colorations to such thermoplastic articles for decorative, aesthetic, and/or protective (such as ultraviolet or infrared protection) purposes. Basically, the possible uses for such a low-migratory, thermally stable colorant for such items as thermoplastics (particularly polyesters such as transparent polyethylene terephthalate) is voluminous and cannot easily be enveloped. Other possible end-uses, however, would include within solvent systems, printing inks, within and on textiles (either on or within textiles, fibers, or fabrics) and the like.

Other types of articles contemplated within this invention for the inventive colorant compounds include, again without limitation, thermoplastic articles, such as films, sheets, bottles, containers, vials, and the like. Other colorants may be added to or incorporated therein with such inventive colorant compounds to produce different hues and tints, again for aesthetic, decorative, and/or protective purposes. Ultraviolet absorbers may also be introduced, incorporated, and the like, in order to protect the article or, if in container for, the contents therein. The inventive colorants exhibit a certain degree of ultraviolet protection alone. However, due to such protective characteristics, when an ultraviolet absorber is present with such an inventive colorant, or combinations of colorants with such an inventive colorant, such an ultraviolet absorber (or absorbers) may be added in reduced amounts in order to provide the desired UV protection level. Thus, such inventive permit cost reductions (by avoiding the cost of larger amounts of expensive UV absorbers) without sacrificing UV protection.

Such thermoplastic colorants (and other additives) are typically added to such compositions during the injection molding (or other type of molding, such as blow molding), thereof, including, and without limitation, by mixing the liquid absorber with resin pellets and melting the entire coated pellets, or through a masterbatch melting step while the resin and absorber are pre-mixed and incorporated together in pellet form. Such thermoplastics and/or thermosets include, again without limitation, polyolefins, polyesters, polyamides, polyurethanes, polycarbonates, and other well known resins, such as those disclosed within U.S. Pat. Nos. 4,640,690, to Baumgartner et al., and U.S. Pat. No. 4,507,407, to Kluger et al. under the term "thermoplastics" and/or "thermosets". Generally, such plastics, including the colorant, UV absorber, and other potential additives, are formed through any number of various extrusion, etc., techniques, such as those disclosed in the aforementioned U.S. patents. Preferred thermoplastics are polyesters, such as, in one non-limiting embodiment, polyethylene terephthalate. "Plastic packaging" thus encompasses containers, sheets, blister packages, and the like, utilized for storage purposes and which include the plastics in any combination as noted above.

The term "pure, undiluted state" as used in conjunction with the inventive colorant compounds indicates that the compounds themselves without any additives are liquid at room temperature or which thus encompasses all types that exhibit viscosities of at most 100,000 cps at room temperature or meet such viscosity limits upon exposure to temperatures of at most about 40° C. and which remain within said low viscosity range thereafter for at least 24 hours upon cooling to room temperature. Thus, there is no need to add solvents, viscosity modifiers, and other like additives to the compounds to effectuate such a desirable physical state.

The presence of surfactants, solvents, and the like, may be utilized to alter the solubility, coloring characteristics, and the like, of the ultimate inventive polymeric anthraquinone colorant which would be understood and appreciated by the ordinarily skilled artisan within this particular art.

The colorant compounds (I), above, are, again, liquid in their pure, undiluted state; however, liquid pasty or liquid waxy colorants are also encompassed within this invention, due to their handling improvement over clearly solid (or solid waxy) colorants of similar structures. In order to effectuate coloring of substrates and media, any other standard colorant additives, such as resins, preservatives, surfactants, solvents, antistatic compounds, antimicrobial agents, and the like, may also be utilized within the inventive colorant compound compositions or methods.

DESCRIPTION OF THE PREFERRED EMBODIMENT

The specific formulations below, as well as the following exemplified methods of producing such and methods of coloring using such are thus indicative of the preferred embodiments of this invention:

Synthesis of Intermediates

EXAMPLE 1

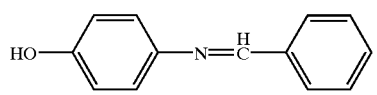

Ethanol (200 proof, 515 g) and p-aminophenol (300 g, 2.75 mol) were charged into a 2L 3-neck round bottom flask equipped with a thermometer and a condenser. Benzaldehyde (292 g, 2.75 mol) was added from an additional funnel while maintaining a slow and steady flow and while stirring. Another portion of ethanol (150 g) was added and the whole mixture was heated to reflux for 1.5 h. After cooling down to room temperature, the solid thus formed was collected by filtration and washed three times with ethanol (3×50 ml) and dried. 492 g (91%) of imine product was obtained as a pale yellow powder.

EXAMPLE 2

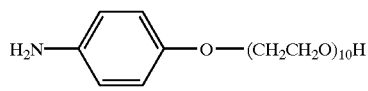

The imine product (285 g, 1.44 mol, from Example 1) was reacted with 634 g of ethylene oxide in 200 ml of toluene, according to the procedures described in U.S. Pat. Nos. 5,082,938 and 5,591,833, to yield 910 g (98.2%) of pale brown yellow liquid product.

EXAMPLE 3

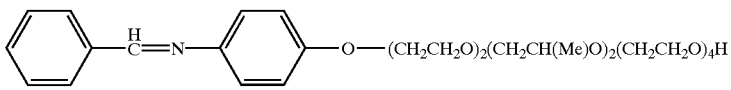

The imine product (1182 g, 6 mol, from Example 1) was reacted, according to the procedures described in U.S. Pat. Nos. 5,082,938 and 5,591,833, with ethylene oxide (528 g, 12 mol), propylene oxide (696 g, 12 mol), and ethylene oxide (1056 g, 24 mol), respectively, in 1400 ml of toluene to yield 3360 g (97%) of the product depicted above as a pale brown yellow liquid.

EXAMPLE 4

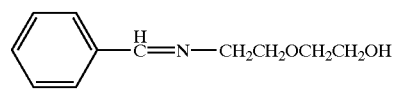

The imine product of Example 2 (340 g, 0.27 mol) was hydrolyzed in the presence of water (150 ml) and hydrochloric acid (56 g) to generate 285 g (97%) of the alkoxylated aniline product depicted above as a light brownish yellow liquid.

EXAMPLE 5

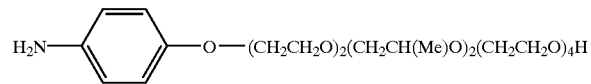

The imine product of Example 3 (600 g) was hydrolyzed in the presence of water (220 g) and concentrated hydrochloric acid (45 g) to result in 493 g of the aniline product depicted above as a light brownish yellow liquid.

EXAMPLE 6

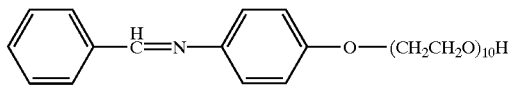

2-[2-(benzylidene-amino)-ethoxy]-ethanol

Diglycolamine (1000.9 g) and benzaldehyde (1060.7 g) were heated under vacuum at 95° C. until the % water was less than 0.1% to yield the diglycolamine-benzaldehyde imine.

EXAMPLE 7

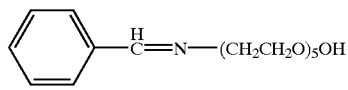

5 EO Alkoxylated Imine

The product from example 3 (386 g) was mixed with N,N-dimethylcyclohexylamine (5.0 g) in a 1-gallon pressure reactor. The contents were purged three times with nitrogen (60 psi) and then heated to 200° F. Ethylene oxide (173 g) was added gradually under pressure. The reaction was held for 30 minutes after the all the EO was added. The reaction was vacuum stripped for 15 minutes at 200° F. to yield the alkoxylated diglycolamine-imine (649 g) with an average of 3 moles of EO added (by GC).

EXAMPLE 8

5EO Alkoxylated Amine

The product from example 4 above (100 g) was mixed with water (200 g) and heated at approximately 70° C. until all the benzaldehyde had azeotroped off. The water was replaced as needed during the reaction to maintain approximate volume. After the removal of the benzaldehyde, the water was stripped off to give the free amine.

Synthesis of Inventive Colorants

EXAMPLE 9

1,5-bis-(4-polyalkoxy-phenylamino)-anthraquinone 1,5-dichloroanthraquinone (10.53 g), and the amine from example 5 (50.62 g,), sodium acetate (7.88 g,), and copper (I) chloride (0.13 g,) were mixed and heated under nitrogen at 130° C. for 15 hours. The reaction was partially cooled and 5% HCl (150 mL) was added. The reaction was washed once more in a similar manner and then washed with deionized water. The residual water was removed under reduced pressure to give the product as a viscous red liquid with a $\lambda_{max}$=522 nm (methanol).

Comparative Example 1

1,5 -bis-(4-methoxy-phenylamino)-anthraquinone p Made according to the procedure of Example 4 within Great Britain Patent No. 2,011,940. The product was a red solid with a $\lambda_{max}$ of 538 (in methylene chloride).

EXAMPLE 10

Synthesis of 5EO 1,5-alkylamino AQ Red 1,5-dichloroanthraquinone (60.08 g) and the amine from example 8 (166.55 g) were heated at 130° C. under nitrogen for 7 hours. The reaction was cooled and 45% KOH (26.98 g) was added and the reaction heated for an additional 6.5 hours. After cooling, 45% KOH (6.75 g) was added and the reaction reheated and continued for an additional 2.5 hours. The reaction was cooled and an additional 6.75 g of 45% KOH was added. The reaction was continued for a total reaction time of 17 hours. 225 mL of water was added and the reaction heated to 85° C. and the bottom product layer was returned to the reaction vessel. The product was washed twice more with water and then stripped to remove water which gave a red liquid with a $\lambda_{max}$ of 520 nm (methanol).

Comparative Example 2

1,5-bis(ethanolamino)anthraquinone 1,5-dichloroanthraquinone (15.04 g), ethanolamine (22.2 g), and 2-ethoxyethanol (110 mL) were heated to reflux under nitrogen for 20 hours in a 3-neck flask equipped with a stirrer, thermocouple, and condenser. The solution was cooled and water (170 mL) was then added. The resulting solid was then filtered, rinsed with water (100 mL), rinsed with methanol (100 mL), and then dried at 60° C. After drying, the yield was found to be 16.4 g. 10 g of this solid was then recrystallized from N,N-dimethylformamide (100 mL) to give 1,5-bis(ethanolamino)anthraquinone (6.55 g) which exhibited a $\lambda_{max}$ of 525 nm (DMSO).

EXAMPLE 11

1,5-bis(o-carboxyaniline)anthraquinone PEG-400 ester 1,5-bis(o-carboxyanilino)anthraquinone (prepared according to the method of U.S. Pat. No. 4,359,570) (13.0 g), PEG-400 (polyethylene glycol) (27.2 g) and titanium butoxide (0.2 mL) were heated under nitrogen for 4.5 hours at 180° C. Water (30 ML) was added and the mixture heated to 80° C. and the layers separated. The organic layer was dissolved in methylene chloride (100 mL), filtered to remove residual solids, and then washed with water 150 mL. The solvent was removed under reduced pressure to give a red liquid with a $\lambda_{max}$ of 504 nm (methanol).

Comparative Example 3

1,5-Bis(o-carboxyanilino)anthraquinone (prepared according to U.S. Pat. No. 4,359,570).

EXAMPLE 12

Polymeric Caproic Acid Red 1,5-dichloroanthraquinone (36.2 g), 6-amino-caproic acid sodium salt (50.0 g), and PEG-200 (150 g) were heated under nitrogen at 130° C. for 15 hours. After cooling, water (25 mL) was added and the pH adjusted to 5.5 with 6 M HCl. The water was removed under vacuum and p-toluenesulfonic acid (1.0 g) was added. The reaction was heated at 160° C. under vacuum for 6 hours. The color was washed three time with water as in previous examples. After removal of residual water under reduced pressure, a red liquid was obtained with a $\lambda_{max}$ of 520 nm (methanol).

EXAMPLE 13

Polymeric 1,8-Anthraquinone Red

To a 250 mL three neck flask equipped with a mechanical stirrer and nitrogen purge was added 1,8-dichloroanthraquinone (25.01 g) and Jeffamine® D-400 (from Huntsman) (145.3 g). The reaction was heated at 130° C. for 18 hours. After cooling to room temperature, water (100 mL) was added and the mixture heated to 80° C. The layers were separated and the organic layer was washed twice more in a similar manner. The residual water was removed on a rotovap to give a red liquid exhibiting a $\lambda_{max}$ of 546 nm (Methanol).

EXAMPLE 14

1,8-bis-(4-polyalkoxy-phenylamino)-anthraquinone

To a 500 mL three neck flask equipped with a mechanical stirrer and nitrogen purge was added 1,8-dichloroanthraquinone (25.0 g), the amine from example 4 (200 g), copper (II) oxide (1.0 g), sodium carbonate (20.0 g), and copper (I) chloride. The reaction was heated at 130° C. for 18 hours. After cooling, water (200 mL) was added and the pH raised to 12 with 45% potassium hydroxide. The product was filtered, heated to 80° C. and the layers separated. Water (200 mL) was added, the pH was lowered to 5 with 40% sulfuric acid and methylene chloride (200 mL) was added. The layers were separated and the product was stripped on a rotovap to give a purple liquid exhibiting a $\lambda_{max}$ of 519 nm in methanol.

Thermoplastic Composition Formation in Polyester

In each instance noted below, the sample liquid colorant was introduced within an injection molding operation for a polyester thermoplastic, in this instance polyethylene terephthalate (ClearTuf® 8006 PET resin from Shell). The liquid colorant, in an amount of 1,500 ppm of the total amount of resin, was blended via agitation onto the hot, dried polyethylene terephthalate resin (in pellet form). The blend of colorant and pellets was gravity fed into the feed throat of the machine. In the feed section, melting was accomplished through the utilization of a heated (heat transferred from the barrel of the machine) screw extruder which rotated. The rotation of the screw provided thorough mixing of the colorant and molten resin together producing a uniform plastic melt which was injected into a mold in order to form the thermoplastic article, for instance a 2 inch by 3 inch plaque with a uniform thickness of 50 mils and a surface area of 12.5 in$^2$.

This method was followed for the production of PET plaques comprising the colorants of Examples 9–12, above, and provided a pleasing red or purple (Example 14) shade with no visible color differences, bubbles, streaks, or other deleterious effects in both sample plaques.

The same thermoplastic production method was followed for the colorant of Comparative Examples 1, 2, and 3, above. Comparative Example 3 exhibited poor dispersion of the color into the target resin and exhibited specks of color therein.

Extraction Analyses for Inventive Colored Plastics

Polyester terephthalate plaques were tested for extraction of color under the following procedure (having a detection limit of 10 ppb) (hereinafter referred to as the "heated alcohol extraction test"):

Eight plaques were cut in half and placed in a stainless steel extraction vessel. To the extraction vessel was added 125 g of 10% ethanol (preheated to 70° C.) was added. The vessels were sealed and then placed in a 70° C. oven for 2.5 hours. The vessels were then removed and allowed to cool to room temperature. In all cases, the plaques were separated with small glass slides and were completely immersed and exposed to the extraction solvent. This test was then duplicated for the same sample.

The extracts were then analyzed spectrophotometrically to determine the presence or absence of extracted colorant. A Beckman® DU 650 spectrophotometer with a 10.0 cm path length cell was used. The instrument was first calibrated to zero using the extract obtained from the uncolored polyester plaques. The extract from the extraction of the plaques containing the various colorant additives was then scanned through the ultraviolet/visible range to determine the presence or absence of detectable peaks at the additives' lambda max. The examples were mostly adjusted in loading amounts in accordance with the desired similar color strengths within the finished end products. Plaque B comprised a larger amount of colorant (for a very high color strength) that exhibited unusually low extraction. The loading of the examples was matched roughly in color strength to the loading of the relevant comparative example.

TABLE 1

Extraction data for Inventive Colored PET Resins

| Plaque | Colorant | Plaque Loading | Result |
|---|---|---|---|
| A | from Example 9 | 2500 ppm | 0.0133 |
| B | from Example 10 | 3500 ppm | 0.0166 |

TABLE 1-continued

Extraction data for Inventive Colored PET Resins

| Plaque | Colorant | Plaque Loading | Result |
|---|---|---|---|
| C | from Example 11 | 2500 ppm | 0.0046 |
| D | from Example 12 | 2500 ppm | 0.0384 |
| E | from Comparative Example 1 | 803 ppm | 0.107 |
| F | from Comparative Example 2 | 1138 ppm | 0.00315 |
| G | from Comparative Example 3 | 1544 ppm | 0.0033 |

An extraction level of below 0.05 is highly desired in accordance with this protocol. Thus, the inventive Examples were comparable to Comparative Examples 2 and 3 for extraction. To the contrary, Comparative example 1 demonstrated very poor extraction.

Thermal Stability Analyses of Inventive Colored Resins

Thermoplastic plaques (2 inches by 3 inches) of polyester terephthalate (as above) were first injection molded. A total of ten plaques were then collected from the standard injection molding operation. The same injection molding machine used to produce these first ten plaques was then was paused during production of ten further plaques and allowed to remain idle for 15 minutes at the standard polyester processing temperatures (~277° C.). At the end of the 15-minute pause, the machine was then restarted without purging the colored resin from the heated barrel of the machine. Ten consecutive plaques were then collected and numbered after resumption of the injection molding operation.

The color of the ten plaques collected from the standard operation was measured in C both reflectance and transmittance on a Gretag-Macbeth Color-Eye 7000A Spectrophotometer and averaged together to represent the standard. Each of the ten consecutive plaques collected after the 15-minute hold period were measured individually and sequentially on the spectrophotometer. The color difference between the standard and the each of the ten plaques was determined by the $\Delta E_{CMC}$. The maximum $\Delta E_{CMC}$ of the ten plaques collected after the 15-minute hold period represents the largest color difference and is determined to be the colorant's thermal stability. The results are tabulated below:

TABLE 3

Thermal Stability Data in PET

| Colorant Composition | $\Delta E_{CMC}$ |
|---|---|
| Example 9 | 0.9 |
| Example 10 | 2.1 |
| Example 11 | 1.4 |
| Example 12 | 1.2 |
| Example 13 | 1.7 |

A $\Delta E_{CMC}$ of less than 4 is considered to be excellent when analyzed by this protocol. In comparison with the costs involved in providing the proper thermally stable colorants of the Comparative Examples (as discussed above), coupled with the extraction problems of Comparative Example 1, and the dispersion problems noted with Comparative Example 3, the inventive colorants provide unexpected improvements in easier-to-handle forms for less cost than these solid previously used compounds.

Other Plastic Applications for the Inventive Colorants

The colorant from example 9, above, was used to make a polyurethane foam according to the procedure of Example 1 in U.S. Pat. No. 5,731,398 to Milliken & Company. The finished foam product exhibited a pleasing red shade.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications that incorporate the features of the invention within the true meaning, spirit, and scope of such claims.

We claim:

1. A red poly(oxyalkylenated) anthraquinone colorant, wherein said colorant conforms to the structure of Formula (I)

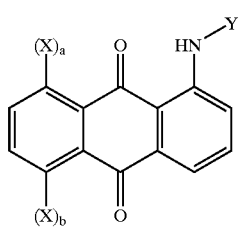

wherein X is N(H)Y; a is 0 or 1 and b is 0 or 1; wherein if a=1 then b=0 and if b=1 then a=0; Y is $[(D)_z-Q]_w$-F, wherein D is selected from the group consisting of phenyl and substituted phenyl, wherein w is 0 or 1, wherein z is any of 1 to 3, and wherein F conforms to the structure of Formula (II)

[polyoxyalkylene constituent]$_u$R'  (II)

wherein u is 1 or 2; wherein said polyoxyalkylene constituent consists of at least three monomers and said monomers are selected from the group consisting of at least one $C_{2-20}$ alkyleneoxy group, glydicol, glycidyl, or mixtures thereof, and R' is selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsufonyl, $C_{1-20}$ alkylphenyl, phosphonyl, $C_{1-20}$ alkylphosphonyl, $C_{1-20}$ alkoxycarbonyl, and phenylthio; and Q is selected from the group consisting of N, O, S, $SO_2$, $SO_3$, $CO_2$, $SO_2$ N, alkyl, and alkoxy.

2. The colorant of claim 1 wherein a is 1 and z is 1.

3. The colorant of claim 1 wherein b is 1 and z is 1.

4. The colorant of claim 2 wherein Q is O, R' is hydrogen, D is substituted phenyl, polyoxyalkylene constituent is selected from the group consisting of ethylene oxide, propylene oxide, and any mixtures thereof, u is 1, and w is 1.

5. The colorant of claim 3 wherein Q is O, R' is hydrogen, D is substituted phenyl, polyoxyalkylene constituent is selected from the group consisting of ethylene oxide, propylene oxide, and any mixtures thereof, u is 1, and w is 1.

6. An article comprising at least one polymeric formulation selected from the group consisting of at least one thermoplastic component, at least one thermoset component, and any mixtures thereof, and also comprising at least one colorant, either present within said polymeric formulation or adhered to the surface of said polymeric formulation, wherein said colorant is defined within claim 1.

7. An article comprising at least one polymeric formulation selected from the group consisting of at least one thermoplastic component, at least one thermoset component, and any mixtures thereof, and also comprising at least one colorant, either present within said polymeric formulation or adhered to the surface of said polymeric formulation, wherein said colorant is defined within Claim 2.

8. An article comprising at least one polymeric formulation selected from the group consisting of at least one thermoplastic component, at least one thermoset component, and any mixtures thereof, and also comprising at least one colorant, either present within said polymeric formulation or adhered to the surface of said polymeric formulation, wherein said colorant is defined within claim 3.

9. An article comprising at least one polymeric formulation selected from the group consisting of at least one thermoplastic component, at least one thermoset component, and any mixtures thereof, and also comprising at least one colorant, either present within said polymeric formulation or adhered to the surface of said polymeric formulation, wherein said colorant is defined within claim 4.

10. An article comprising at least one polymeric formulation selected from the group consisting of at least one thermoplastic component, at least one thermoset component, and any mixtures thereof, and also comprising at least one colorant, either present within said polymeric formulation or adhered to the surface of said polymeric formulation, wherein said colorant is defined within claim 5.

* * * * *